United States Patent
Wu et al.

(10) Patent No.: US 10,018,128 B2
(45) Date of Patent: Jul. 10, 2018

(54) VARIABLE-SPEED SUPERCHARGER FOR HIGHLY DILUTED INTERNAL COMBUSTION ENGINES

(71) Applicant: GM Global Technology Operations LLC, Detroit, MI (US)

(72) Inventors: Ko-Jen Wu, West Bloomfield, MI (US); Oliver Rudwinsky, Oakland, MI (US); Robert S. McAlpine, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/228,301

(22) Filed: Aug. 4, 2016

(65) Prior Publication Data
US 2018/0038293 A1    Feb. 8, 2018

(51) Int. Cl.
*F01N 3/00* (2006.01)
*F01N 5/04* (2006.01)
(Continued)

(52) U.S. Cl.
CPC ....... *F02D 41/0007* (2013.01); *F01N 3/2066* (2013.01); *F01N 13/10* (2013.01);
(Continued)

(58) Field of Classification Search
CPC ............. F01N 2290/00; F01N 2290/04; F01N 2290/10; F02D 41/005; F02D 41/0052;
(Continued)

(56) References Cited

U.S. PATENT DOCUMENTS 9,631,629 B2 *    4/2017    Bidner ................ F04D 27/0207
2005/0211231 A1 *    9/2005    Kelley, Jr. ............... F02B 39/04
                                                                              123/559.1
(Continued)

OTHER PUBLICATIONS

K. S. Hoyer, M. Sellnau, J. Sinnamon and H. Husted, "Boost System Development for Gasoline Direct-Injection Compression-Ignition (GDCI)," SAE Paper 2013-01-0928, 2013 (pp. 815-826).
(Continued)

*Primary Examiner* — Phutthiwat Wongwian
*Assistant Examiner* — Diem Tran
(74) *Attorney, Agent, or Firm* — Harness, Dickey & Pierce, P.L.C.

(57) ABSTRACT

An engine control system includes an internal combustion engine including a plurality of cylinders. An intake manifold is connected to the internal combustion engine. An exhaust manifold is connected to the internal combustion engine. A supercharger is connected to an air intake passage and the intake manifold and includes a variable speed drive. A throttle valve is disposed in the air intake passage. An exhaust passage is in connection with the exhaust manifold. A passive selective catalytic reduction catalyst system is in communication with the exhaust passage. An exhaust gas recirculation passage is in communication with the exhaust passage and the air intake passage and includes an exhaust gas recirculation valve. A controller controls the variable speed drive of the supercharger and the throttle valve and the exhaust gas recirculation valve based upon engine conditions.

6 Claims, 2 Drawing Sheets

Figure 1:
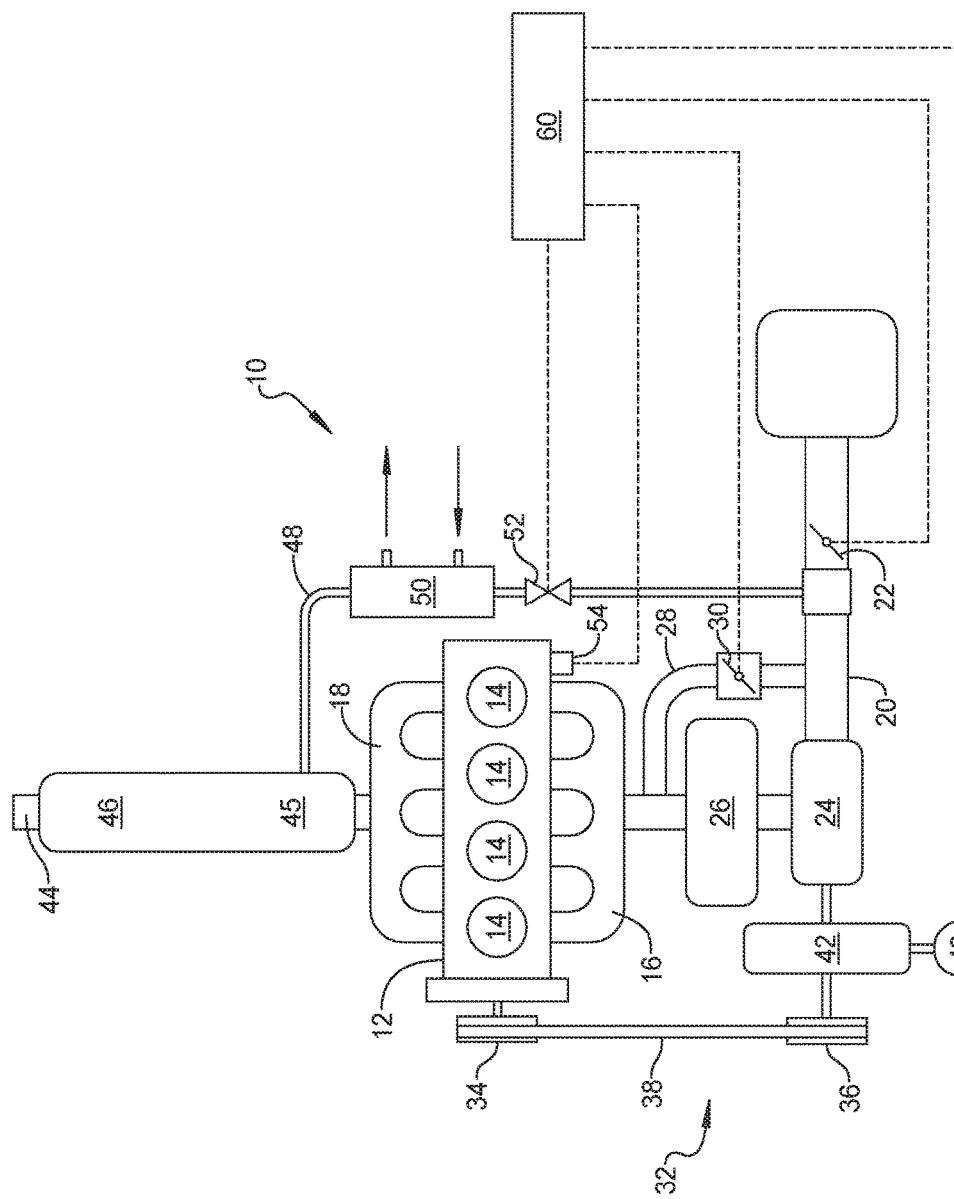

(51) Int. Cl.
| | |
|---|---|
| *F01N 3/10* | (2006.01) |
| *F02D 41/00* | (2006.01) |
| *F01N 3/20* | (2006.01) |
| *F02M 26/02* | (2016.01) |
| *F02M 26/14* | (2016.01) |
| *F02M 26/17* | (2016.01) |
| *F02M 26/52* | (2016.01) |
| *F02M 35/104* | (2006.01) |
| *F02B 39/04* | (2006.01) |
| *F01N 13/10* | (2010.01) |

(52) U.S. Cl.
CPC .............. *F02B 39/04* (2013.01); *F02M 26/02* (2016.02); *F02M 26/14* (2016.02); *F02M 26/17* (2016.02); *F02M 26/52* (2016.02); *F02M 35/104* (2013.01); *F01N 2610/02* (2013.01); *F02D 2041/0017* (2013.01)

(58) Field of Classification Search
CPC . F02D 41/0057; F02D 41/006; F02D 41/0077
USPC ................ 60/278, 280, 285, 605.2, 607, 611
See application file for complete search history.

(56) References Cited

U.S. PATENT DOCUMENTS

2008/0131346 A1* 6/2008 Morita ............... B01D 53/9409
423/239.1
2009/0308054 A1* 12/2009 Satoh ................. B01D 53/9422
60/285
2015/0033736 A1* 2/2015 Kalebjian ........... F02B 29/0412
60/605.2

OTHER PUBLICATIONS

V. Prikhodko, J. E. Parks, J. A. Pihl and T. J. Toops, "Ammonia Generation and Utilization in a Passive SCR (TWC+SCR) System on Lean Gasoline Engine," SAE Paper 2016-01-0934, 2016 (7 pages).

J. Wartha, F. Westin, A. Leu and M. De Marco, "Opel 2.0-L Biturbo Diesel Engine with Two-Stage Intercooling," MTZ, vol. 73, 2012 (pp. 28-33).

T. Eidenöck, K. Mayr, W. Neuhauser and P. Staub, "The New BMW Six-Cylinder Diesel Engine with Three Turbochargers, Part 1: Drive Unit and Turbocharger System," MTZ, vol. 73, 2012 (pp. 18-24).

S. McBroom, R. A. Smithson, R. Urista and C. Chadwell, "Effects of Variable Speed Supercharging Using a Continuously Variable Planetary on Fuel Economy and Low Speed Torque," SAE Paper 2012-01-1737, 2012 (12 pages).

V. Tsourapas and R. P. Benjey, "Eaton's Electrically Assisted TVS® Supercharger with Variable Speed, Mild-Hybrid and Engine Start/Stop Functionalities," 19th Dresden Supercharging Conference, 2014 (23 pages).

J. King, L. Barker, J. Turner and J. Martin, "SuperGen—A Novel Low Costs Electro-Mechanical Mild Hybrid and Boosting System for Engine Efficiency Enhancements," SAE Paper 2016-01-0682, 2016 (6 pages).

* cited by examiner

VARIABLE-SPEED SUPERCHARGER FOR HIGHLY DILUTED INTERNAL COMBUSTION ENGINES

STATEMENT OF GOVERNMENT RIGHTS

The present invention was made with government support under Cooperative Agreement No. DE-EE0006853 (Lean Miller Cycle System Development) awarded by the U.S. Department of Energy. The Government has certain rights in the invention.

FIELD

The present disclosure relates to the use of a single supercharger that is also equipped with a variable-speed drive for a highly diluted, by both excess air and recirculated exhaust gas, internal combustion engine.

BACKGROUND

This section provides background information related to the present disclosure which is not necessarily prior art.

High levels of charge dilution by excess air along with recirculated exhaust gas is considered as one of the technologies to further internal combustion engines' thermal efficiency beyond engine downsizing.

For a lean combustion engine, the three-way catalyst (TWC) that is commonly used on stoichiometric engines is unable to control NOx effectively to meet the increasingly stringent exhaust emissions regulations. In order to manage NOx, an SCR (selective catalytic reduction) catalyst system is also required. One class of the SCR technology that is particularly attractive for lean combustion engine application is a passive system. The passive SCR catalyst can be applied as a standalone system or be complimented by a downsized urea-based system with the advantages of reduced packaging requirement and lower system cost.

The passive SCR system encompasses a TWC upstream and an SCR catalyst downstream in the exhaust system. The engine can be momentarily operated at a slightly rich equivalence ratio to use the TWC to generate ammonia which can be stored in the downstream SCR catalyst. The engine is then operated at the intended lean equivalence ratios for the desired thermal efficiency benefits and depends on the SCR catalyst to control NOx. When the stored ammonia in the SCR catalyst is depleted, the engine is switched to the ammonia generation mode again. By cycling between the lean and rich modes, both the efficiency and emissions control goals can be met.

To achieve the levels of dilution to match that desired for optimum combustion process, high levels of boost are required over a broad engine operating range including light-load conditions. Numerous advanced boosting solutions have been engineered with some being implemented for production. Essentially, all the advanced boosting solutions entail compound boosting of multiple turbochargers of different sizes or a turbocharger in combination with a supercharger. However, the use of multiple turbochargers or a turbocharger in combination with a supercharger can add undesirable cost and packaging complexities.

SUMMARY

This section provides a general summary of the disclosure, and is not a comprehensive disclosure of its full scope or all of its features.

An engine control system according to the present disclosure includes an internal combustion engine including a plurality of cylinders. An intake manifold and an exhaust manifold are connected to the internal combustion engine. A supercharger is connected to an air intake passage and the intake manifold and includes a variable speed drive. A throttle valve is disposed in the air intake passage. An exhaust passage is in connection with the exhaust manifold. A passive selective catalytic reduction catalyst system is in communication with the exhaust passage. An exhaust gas recirculation passage is in communication with the exhaust passage and the air intake passage and includes an exhaust gas recirculation valve. A controller controls the variable speed drive of the supercharger and the throttle valve and the exhaust gas recirculation valve based upon engine speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
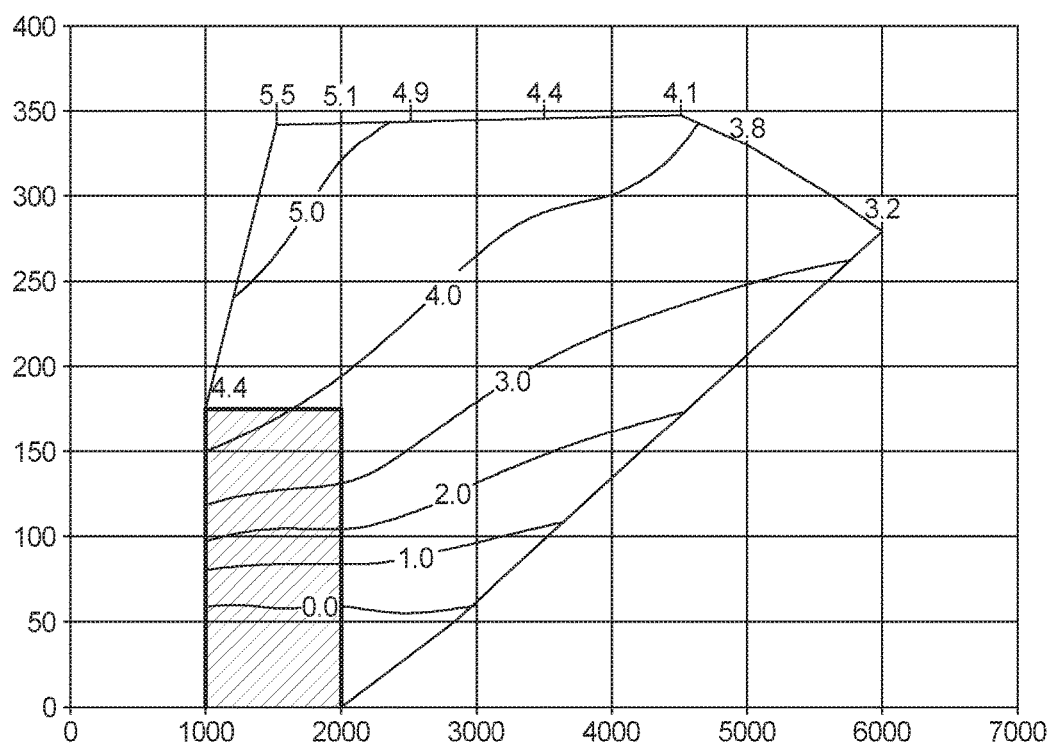

FIG. 1 is a schematic diagram of an engine control system according to the principles of the present disclosure; and FIG. 2 is a map of a desired supercharger to engine speed ratio calibration.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference to FIG. 1, an engine control system 10 according to the principles of the present disclosure will now be described. The engine control system 10 includes an internal combustion engine 12 including a plurality of cylinders 14. An intake manifold 16 is connected to the internal combustion engine 12. An exhaust manifold 18 is connected to the internal combustion engine 12. An air induction system includes an air intake passage 20 that is connected to the intake manifold 16. A throttle valve 22 is disposed within the air intake passage 20. In addition, a supercharger 24 is disposed within the air intake passage 20. A charge air cooler 26 is disposed downstream of the supercharger 24 and is in communication with the intake manifold 16. A recirculation passage 28 is provided in communication with the air intake passage 20 and includes a recirculation valve 30 disposed therein. The recirculation passage 28 is in communication with the air intake passage 20 at a location downstream of the charge air cooler 26 for redirecting induction air upstream of the supercharger 24. A supercharger drive system 32 is provided and can include a drive pulley 34 that is driven by the internal combustion engine 12 and a driven pulley 36. The drive pulley 34 and driven pulley 36 can be connected by a belt or chain 38. The supercharger drive system 32 includes a variable speed drive mechanism 42 that can be located anywhere in the drive system, but which is illustrated in connection between the driven pulley 36 and the supercharger 24. An actuator 43 can adjust the drive ratio of the variable speed drive mechanism 42.

An exhaust after-treatment system includes an exhaust passage 44 connected to the exhaust manifold 18. The exhaust after-treatment system includes an upstream three-way catalyst (TWC) 45 and a selective catalytic reduction SCR catalyst 46 downstream in the exhaust system.

An exhaust gas recirculation passage 48 can be in communication with the exhaust gas passage 44 and the intake air passage 20. An exhaust gas recirculation cooler 50 can be provided in the exhaust gas recirculation passage 48. An exhaust gas recirculation valve 52 can also be provided in the exhaust gas recirculation passage 48. A controller 60 is provided for providing control signals to the variable speed drive 42, the throttle valve 22, the recirculation valve 30, the exhaust gas recirculation valve 52 and to the variable valve actuation means, if equipped, fuel injector and spark devices (generally at 54) of the internal combustion engine 12.

FIG. 1 shows the schematic of a four-cylinder in-line engine 12, for simplicity, although it should be understood that other engine configurations could be used. The supercharger 24 is driven by the engine 12 via a belt, as the typical practice, although other alternative drive mechanisms could be used. The diameters of the respective pulleys 34, 36 on the engine crankshaft and supercharger 24 primarily determine the speed ratio between the supercharger 24 and the engine 12. The variable speed drive 42 allows for further control of the supercharger speed at a given engine speed. The position of the variable speed drive 42 is not necessarily limited to that shown in FIG. 1. The actuator 43 controls the variable speed drive 42 to adjust the supercharger speed to match the engine's requirement. The variable speed drive 42 can include a planetary continuously variable transmission (CVT) for altering the drive ratio thereof.

Air is supplied to the supercharger 24 via the vehicle air induction system through the throttle body 22. The outlet of the supercharger 24 is connected to the charge air cooler 26 and then to the intake manifold 16 to properly distribute the charge air to the individual cylinders 14 of the internal combustion engine 12. The supercharger recirculation passage 28 is next to the outlet of the charge air cooler 26 and to the inlet of the supercharger 24 and the supercharger recirculation valve 30 is used to control the amount of the recirculated charge.

The exhaust gas recirculation passage 48 provides a low-pressure EGR system. Exhaust gases are taken from the exhaust passage 44 after being properly treated by the after-treatment system. The exhaust gases are then cooled by the exhaust gas recirculation cooler 50, and are metered by the exhaust gas recirculation valve 52 and then injected into the air intake passage 20 behind the throttle body 22. The throttle body 22, recirculation valve 30, variable speed drive 42 and exhaust gas recirculation valve 52 in combination control the amount of air and recirculated exhaust gas entering the engine 12.

The supercharger recirculation valve 30 also provides the function of a charge supply passage to the intake manifold 16, bypassing the supercharger 24 and charge air cooler 26, when the supercharger 24 is fully stopped to eliminate parasitic losses when appropriate. This mode of operation occurs at lighter engine loads when boost is not required to achieve the desired levels of dilution, as shown in the graph of FIG. 2 by the region below the 0.0 drive ratio curve on the engine map.

The engine controller 60 provides the needed coordination of supercharger speed management with the other typical engine control functionalities. FIG. 2 shows a desired supercharger to engine speed ratio calibration. In the low engine speed (RPM, x-axis) and low engine torque (N·m, y-axis) rectangular region of the map that is cross-hatched, a broad supercharger operating speed range is required to achieve the target dilution levels in the combustion chambers. At the very low end of the load range, it is preferred to stop the supercharger 24 when boost is not required.

The variable speed supercharger 42/24 of the present disclosure is beneficial for a highly diluted engine operation by both air and recirculated exhaust gas. By properly controlling the supercharger 24 speed with the engine conditions, sufficient amounts of diluents can be supplied to the engine to ensure an optimum combustion process and thus thermal efficiency of the engine 12.

The engine control system 10 of the present disclosure further features the passive selective catalytic reduction catalyst system 45/46 which allows the variable speed supercharger to provide flexibility for efficient engine operation under different selective catalytic reduction operating modes. In particular, the passive selective catalytic reduction catalyst system 45/46 can be operated in two modes including an NOx reduction mode and an ammonia generation mode. In operation, when enough ammonia is available for the passive selective catalyst reduction catalyst system 45/46, ammonia is introduced to the exhaust gas in the selective catalytic reduction system 46 in order to reduce NOx. When it is determined that the ammonia level is low, the engine can be operated at a slightly rich equivalence ratio to use the three way catalyst 45 to generate ammonia. Operating the supercharger 24 at different airflows can determine whether the engine is operated lean or rich in order to switch between the NOx reduction mode and the ammonia regeneration mode. By cycling between the lean and rich modes, both the efficiency and emissions control goals can be met.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An engine control system, comprising:
    an internal combustion engine including a plurality of cylinders;
    an intake manifold connected to the internal combustion engine;
    an exhaust manifold connected to the internal combustion engine;
    a supercharger connected to an air intake passage and the intake manifold and including a variable speed drive that is drivingly connected to a crankshaft of the internal combustion engine;
    a throttle valve disposed in the air intake passage;
    an exhaust passage in connection with the exhaust manifold;
    an after-treatment system in communication with the exhaust passage;
    an exhaust gas recirculation passage in communication with the exhaust passage and the air intake passage and including an exhaust gas recirculation valve;
    a controller for controlling the variable speed drive of the supercharger and the throttle valve and the exhaust gas recirculation valve based upon engine conditions; and
    a passive selective catalytic reduction catalyst system as part of the after-treatment system, wherein the controller slows the variable speed drive of the supercharger to control the engine rich when an ammonia level of the passive selective catalytic reduction catalyst system is low, wherein the controller increases the variable speed drive of the supercharger to control the engine lean during normal operation.

2. The engine control system according to claim 1, further comprising a recirculation passage connected to the air intake passage upstream and downstream of the supercharger.

3. The engine control system according to claim 2, wherein the recirculation passage includes a recirculation valve controlled by the controller.

4. The engine control system according to claim 3, wherein the controller opens the recirculation valve to bypass the supercharger when the supercharger is not required at low engine loads.

5. The engine control system according to claim 1, wherein the controller controls the variable speed drive to provide a desired drive ratio according to a control map based upon engine speed and engine torque.

6. The engine control system according to claim 1, wherein the variable speed drive is a planetary continuously variable transmission.

\* \* \* \* \*